(12) United States Patent
Yu et al.

(10) Patent No.: US 11,308,391 B2
(45) Date of Patent: Apr. 19, 2022

(54) OFFLINE COMBINATION OF CONVOLUTIONAL/DECONVOLUTIONAL AND BATCH-NORM LAYERS OF CONVOLUTIONAL NEURAL NETWORK MODELS FOR AUTONOMOUS DRIVING VEHICLES

(71) Applicant: Baidu USA LLC, Sunnyvale, CA (US)

(72) Inventors: Zhenhua Yu, Sunnyvale, CA (US); Xiao Bo, Sunnyvale, CA (US); Jun Zhou, Sunnyvale, CA (US); Weide Zhang, Santa Clara, CA (US); Tony Han, Sunnyvale, CA (US)

(73) Assignee: BAIDU USA LLC, Sunnyvale, CA (US)

( * ) Notice: Subject to any disclaimer, the term of this patent is extended or adjusted under 35 U.S.C. 154(b) by 1007 days.

(21) Appl. No.: 15/451,345

(22) Filed: Mar. 6, 2017

(65) Prior Publication Data

US 2018/0253647 A1 Sep. 6, 2018

(51) Int. Cl.
*G06N 3/08* (2006.01)
*G06N 3/04* (2006.01)
(Continued)

(52) U.S. Cl.
CPC .............. *G06N 3/08* (2013.01); *G06F 17/16* (2013.01); *G06K 9/00805* (2013.01);
(Continued)

(58) Field of Classification Search
CPC .......... G06N 3/08; G06N 3/04; G06N 3/0454; G06N 3/082; G06N 3/0445; G06N 3/0481;
(Continued)

(56) References Cited

U.S. PATENT DOCUMENTS 7,082,394 B2 * 7/2006 Burges ................ G06K 9/4647
382/190
10,402,649 B2 * 9/2019 Rabinovich ........... G06F 3/0346
(Continued)

FOREIGN PATENT DOCUMENTS

WO  WO 2017/015887  2/2017

OTHER PUBLICATIONS

Ba, J. L., Kiros, J. R., & Hinton, G. E. (2016). Layer normalization. arXiv preprint arXiv:1607.06450. (Year: 2016).*
(Continued)

*Primary Examiner* — Omar F Fernandez Rivas
*Assistant Examiner* — Tri T Nguyen
(74) *Attorney, Agent, or Firm* — Womble Bond Dickinson (US) LLP

(57) ABSTRACT

In one embodiment, a system to accelerate batch-normalized convolutional neural network (CNN) models is disclosed. The system extracts a plurality of first groups of layers from a first CNN model, each group of the first groups having a first convolutional layer and a first batch-norm layer. For each group of the plurality of first groups, the system calculates a first scale vector and a first shift vector based on the first batch-norm layer, and generates a second convolutional layer representing the corresponding group of the plurality of first groups based on the first convolutional layer and the first scale and the first shift vectors. The system generates an accelerated CNN model based on the second convolutional layer corresponding to the plurality of the first groups, such that the accelerated CNN model is utilized subsequently to classify an object perceived by an autonomous driving vehicle (ADV).

15 Claims, 11 Drawing Sheets

(51) Int. Cl.
*G06F 17/16* (2006.01)
*G06K 9/00* (2022.01)
*G06K 9/62* (2022.01)

(52) U.S. Cl.
CPC ......... *G06K 9/00825* (2013.01); *G06K 9/627* (2013.01); *G06N 3/04* (2013.01); *G06N 3/0454* (2013.01); *G06N 3/082* (2013.01); *G06K 9/00973* (2013.01); *G06N 3/0445* (2013.01); *G06N 3/0481* (2013.01); *G06N 3/088* (2013.01)

(58) Field of Classification Search
CPC .... G06N 3/088; G06F 17/16; G06K 9/00805; G06K 9/00825; G06K 9/627; G06K 9/00973
See application file for complete search history.

(56) References Cited

U.S. PATENT DOCUMENTS

| | | | | |
|---|---|---|---|---|
| 11,062,206 | B2* | 7/2021 | van Hasselt | G06N 3/08 |
| 2006/0018382 | A1* | 1/2006 | Shi | H04N 5/145 375/240.16 |
| 2016/0217368 | A1 | 7/2016 | Ioffe et al. | |
| 2017/0046616 | A1* | 2/2017 | Socher | G06K 9/4628 |
| 2017/0140268 | A1* | 5/2017 | van Hasselt | G06N 3/04 |
| 2018/0144242 | A1* | 5/2018 | Simard | G06N 3/0454 |
| 2018/0157916 | A1* | 6/2018 | Doumbouya | G06K 9/00771 |
| 2018/0211164 | A1* | 7/2018 | Bazrafkan | G06N 3/088 |
| 2020/0090044 | A1* | 3/2020 | Jaitly | G06N 3/0445 |

OTHER PUBLICATIONS

Ioffe, S., & Szegedy, C. (2015). Batch normalization: Accelerating deep network training by reducing internal covariate shift. arXiv preprint arXiv:1502.03167. (Year: 2016).*

Shang, W., Chiu, J., & Sohn, K. (Feb. 2017). Exploring normalization in deep residual networks with concatenated rectified linear units. In Thirty-First AAAI Conference on Artificial Intelligence. (Year: 2017).*

Wu Chunpeng, et al., "ApesNet: A Pixel-Wise Efficient Segmentation Network for Embedded Devices", UK vol. 1 No. 1, pp. 78-85, Dec. 1, 2016, 8 Pages.

Weishengchong, et al., "Speed Improvement by Merging Batch Normalization and Scale", Nov. 11, 2016. 10 Pages.

Sergey Ioffe, et al., "Batch Normalization Accelerating Deep Network Training by Reducing Internal Covariate Shift", Proceedings of Machine Learning Research (PMLR), Proceedings of the International Conference on Machine Learning (ICML 2015), vol. 37, pp. 448-456, Jul. 7, 2015, 9 Pages.

University of Tokyo, "Contour Detection with Deconvolutional Networks" Jun. 9, 2016, 4 Pages.

* cited by examiner

OFFLINE COMBINATION OF CONVOLUTIONAL/DECONVOLUTIONAL AND BATCH-NORM LAYERS OF CONVOLUTIONAL NEURAL NETWORK MODELS FOR AUTONOMOUS DRIVING VEHICLES

TECHNICAL FIELD

Embodiments of the present invention relate generally to operating autonomous vehicles. More particularly, embodiments of the invention relate to offline combination of convolutional/deconvolutional and batch-norm layers of convolutional neural network models for autonomous driving vehicles (ADV).

BACKGROUND

Vehicles operating in an autonomous mode (e.g., driverless) can relieve occupants, especially the driver, from some driving-related responsibilities. When operating in an autonomous mode, the vehicle can navigate to various locations using onboard sensors, allowing the vehicle to travel with minimal human interaction or in some cases without any passengers. In operations, ADV often utilize neural networks to learn and classify objects (e.g., traffic lights) in order to navigate through the roads.

In machine learning, convolutional neural networks (CNN) or deep CNN training and inference are computationally and memory intensive because there are many inner layers in a deep CNN and each layer contributes to a block of computations and memory allocations. Additional activation layers tend to increase inference and test accuracies; however, the additional layers also increase computations and memory allocations required by a deep CNN.

BRIEF DESCRIPTION OF THE DRAWINGS

Embodiments of the invention are illustrated by way of example and not limitation in the figures of the accompanying drawings in which like references indicate similar elements.

DETAILED DESCRIPTION

Various embodiments and aspects of the inventions will be described with reference to details discussed below, and the accompanying drawings will illustrate the various embodiments. The following description and drawings are illustrative of the invention and are not to be construed as limiting the invention. Numerous specific details are described to provide a thorough understanding of various embodiments of the present invention. However, in certain instances, well-known or conventional details are not described in order to provide a concise discussion of embodiments of the present inventions.

Reference in the specification to "one embodiment" or "an embodiment" means that a particular feature, structure, or characteristic described in conjunction with the embodiment can be included in at least one embodiment of the invention. The appearances of the phrase "in one embodiment" in various places in the specification do not necessarily all refer to the same embodiment.

According to some embodiments, an accelerated or new CNN is generated from an original CNN by combining groups of layers of the original CNN into single layers, which significantly improve the efficiency of the real-time calculation. In one embodiment, the system extracts a number of first groups of layers from a first convolutional neural network (CNN) model, each of the first groups having a first convolutional layer and a first batch-norm layer. For each of the first groups, the system calculates a first scale vector and a first shift vector based on the first batch-norm layer, and generates a second convolutional layer representing the corresponding first groups based on the first convolutional layer, the first scale vector, and the first shift vector. The system generates a second CNN model based on the second convolutional layers corresponding to the plurality of the first groups. The second CNN model is utilized subsequently to classify an object perceived by an autonomous driving vehicle. In another embodiment, for each of the first groups, the system calculates a second scale vector and a second shift vector based on a first batch-norm layer and a first scaling layer of the corresponding first group; and generates the second convolutional layer based on the second scale vector, the second shift vector, and the first convolutional layer. The above process may be iteratively performed to process deconvolutional layers. The above process may be performed by a data analytics system offline. The new CNN model can then be uploaded and utilized by an autonomous driving vehicle at real-time to classify objects.

Figure 1:
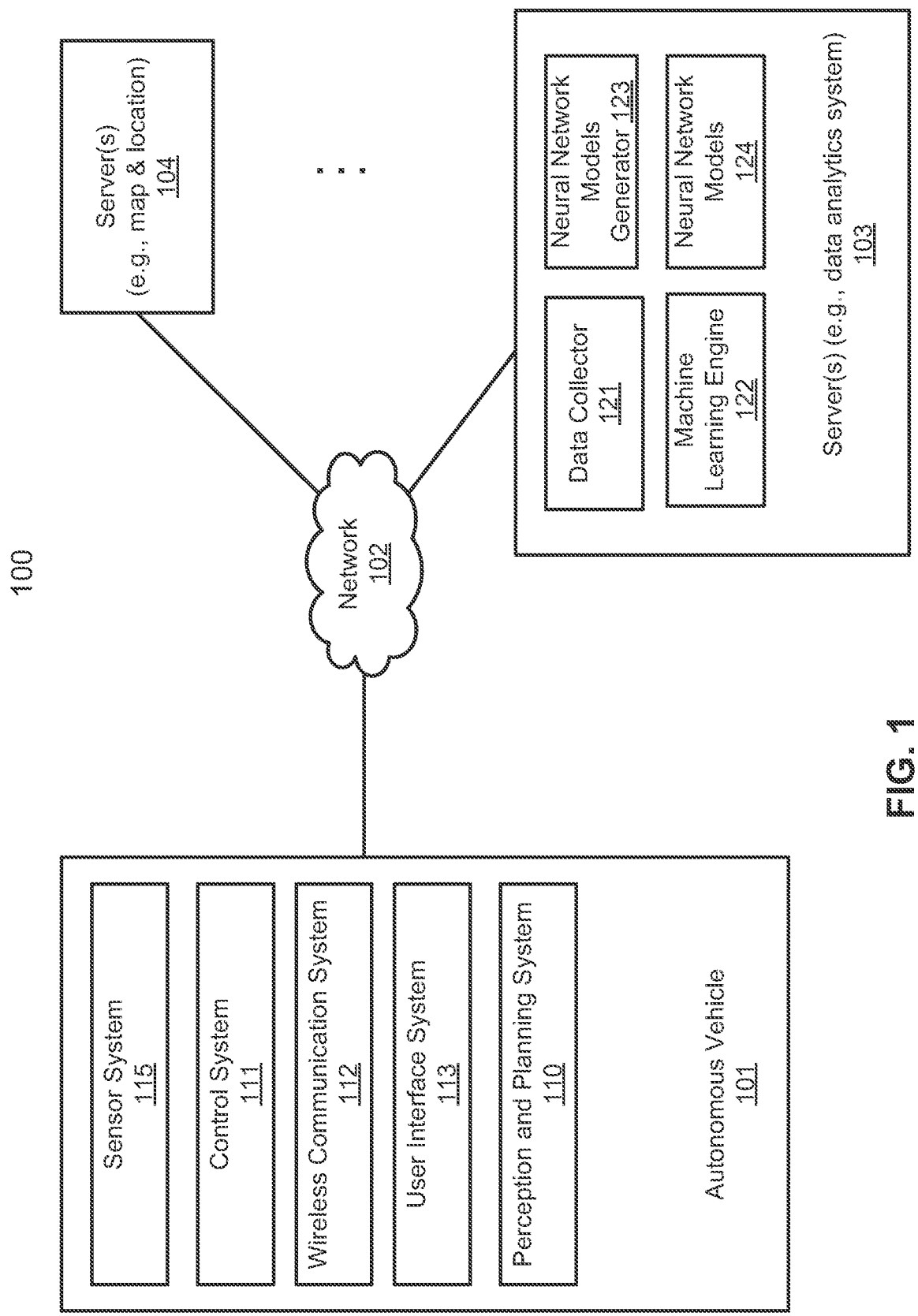
FIG. 1 is a block diagram illustrating a networked system according to one embodiment of the invention.

FIG. 1 is a block diagram illustrating an autonomous vehicle network configuration according to one embodiment of the invention. Referring to FIG. 1, network configuration 100 includes autonomous vehicle 101 that may be communicatively coupled to one or more servers 103-104 over a network 102. Although there is one autonomous vehicle shown, multiple autonomous vehicles can be coupled to each other and/or coupled to servers 103-104 over network 102. Network 102 may be any type of networks such as a local area network (LAN), a wide area network (WAN) such as the Internet, a cellular network, a satellite network, or a combination thereof, wired or wireless. Server(s) 103-104 may be any kind of servers or a cluster of servers, such as Web or cloud servers, application servers, backend servers, or a combination thereof. Servers 103-104 may be data analytics servers, content servers, traffic information servers, map and point of interest (MPOI) severs, or location servers, etc.

An autonomous vehicle refers to a vehicle that can be configured to in an autonomous mode in which the vehicle navigates through an environment with little or no input from a driver. Such an autonomous vehicle can include a sensor system having one or more sensors that are configured to detect information about the environment in which the vehicle operates. The vehicle and its associated controller(s) use the detected information to navigate through the environment. Autonomous vehicle 101 can operate in a manual mode, a full autonomous mode, or a partial autonomous mode.

In one embodiment, autonomous vehicle 101 includes, but is not limited to, perception and planning system 110, vehicle control system 111, wireless communication system 112, user interface system 113, and sensor system 115. Autonomous vehicle 101 may further include certain common components included in ordinary vehicles, such as, an engine, wheels, steering wheel, transmission, etc., which may be controlled by vehicle control system 111 and/or perception and planning system 110 using a variety of communication signals and/or commands, such as, for example, acceleration signals or commands, deceleration signals or commands, steering signals or commands, braking signals or commands, etc.

Components 110-115 may be communicatively coupled to each other via an interconnect, a bus, a network, or a combination thereof. For example, components 110-115 may be communicatively coupled to each other via a controller area network (CAN) bus. A CAN bus is a vehicle bus standard designed to allow microcontrollers and devices to communicate with each other in applications without a host computer. It is a message-based protocol, designed originally for multiplex electrical wiring within automobiles, but is also used in many other contexts.

Figure 2:
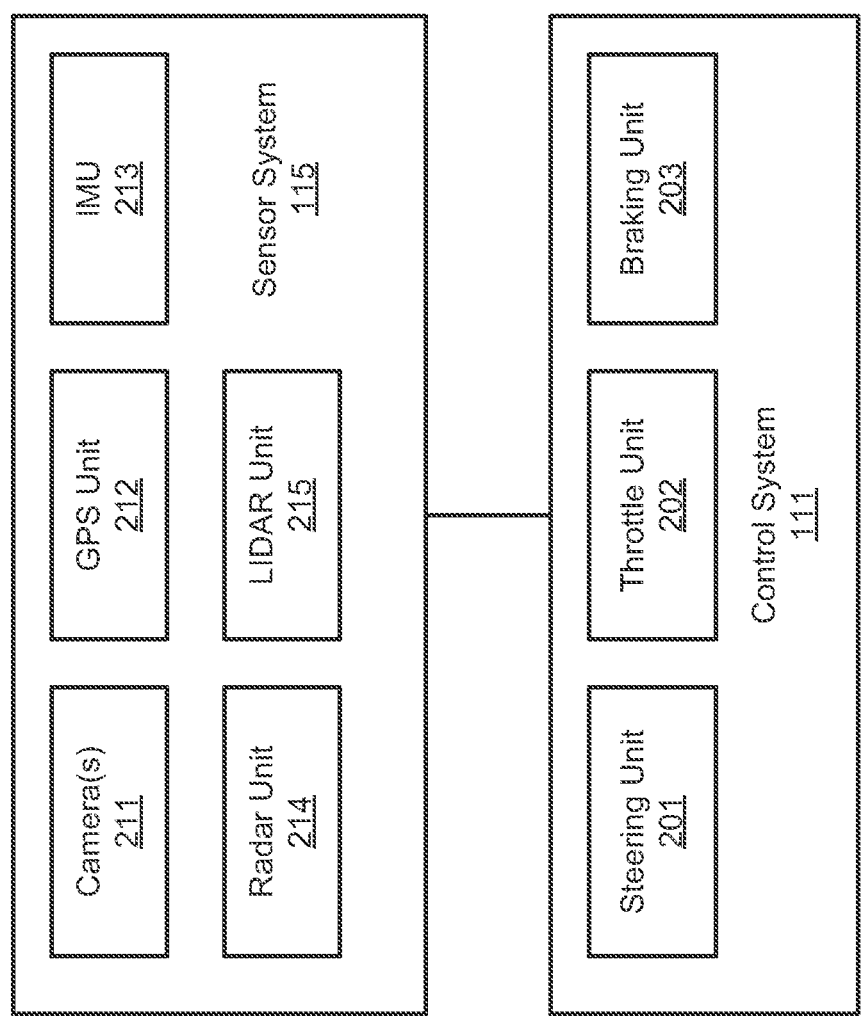
FIG. 2 is a block diagram illustrating an example of an autonomous vehicle according to one embodiment of the invention.

Referring now to FIG. 2, in one embodiment, sensor system 115 includes, but it is not limited to, one or more cameras 211, global positioning system (GPS) unit 212, inertial measurement unit (IMU) 213, radar unit 214, and a light detection and range (LIDAR) unit 215. GPS system 212 may include a transceiver operable to provide information regarding the position of the autonomous vehicle. IMU unit 213 may sense position and orientation changes of the autonomous vehicle based on inertial acceleration. Radar unit 214 may represent a system that utilizes radio signals to sense objects within the local environment of the autonomous vehicle. In some embodiments, in addition to sensing objects, radar unit 214 may additionally sense the speed and/or heading of the objects. LIDAR unit 215 may sense objects in the environment in which the autonomous vehicle is located using lasers. LIDAR unit 215 could include one or more laser sources, a laser scanner, and one or more detectors, among other system components. Cameras 211 may include one or more devices to capture images of the environment surrounding the autonomous vehicle. Cameras 211 may be still cameras and/or video cameras. A camera may be mechanically movable, for example, by mounting the camera on a rotating and/or tilting a platform.

Sensor system 115 may further include other sensors, such as, a sonar sensor, an infrared sensor, a steering sensor, a throttle sensor, a braking sensor, and an audio sensor (e.g., microphone). An audio sensor may be configured to capture sound from the environment surrounding the autonomous vehicle. A steering sensor may be configured to sense the steering angle of a steering wheel, wheels of the vehicle, or a combination thereof. A throttle sensor and a braking sensor sense the throttle position and braking position of the vehicle, respectively. In some situations, a throttle sensor and a braking sensor may be integrated as an integrated throttle/braking sensor.

In one embodiment, vehicle control system 111 includes, but is not limited to, steering unit 201, throttle unit 202 (also referred to as an acceleration unit), and braking unit 203. Steering unit 201 is to adjust the direction or heading of the vehicle. Throttle unit 202 is to control the speed of the motor or engine that in turn control the speed and acceleration of the vehicle. Braking unit 203 is to decelerate the vehicle by providing friction to slow the wheels or tires of the vehicle. Note that the components as shown in FIG. 2 may be implemented in hardware, software, or a combination thereof.

Referring back to FIG. 1, wireless communication system 112 is to allow communication between autonomous vehicle 101 and external systems, such as devices, sensors, other vehicles, etc. For example, wireless communication system 112 can wirelessly communicate with one or more devices directly or via a communication network, such as servers 103-104 over network 102. Wireless communication system 112 can use any cellular communication network or a wireless local area network (WLAN), e.g., using WiFi to communicate with another component or system. Wireless communication system 112 could communicate directly with a device (e.g., a mobile device of a passenger, a display device, a speaker within vehicle 101), for example, using an infrared link, Bluetooth, etc. User interface system 113 may be part of peripheral devices implemented within vehicle 101 including, for example, a keyword, a touch screen display device, a microphone, and a speaker, etc.

Some or all of the functions of autonomous vehicle 101 may be controlled or managed by perception and planning system 110, especially when operating in an autonomous driving mode. Perception and planning system 110 includes the necessary hardware (e.g., processor(s), memory, storage) and software (e.g., operating system, planning and routing programs) to receive information from sensor system 115, control system 111, wireless communication system 112, and/or user interface system 113, process the received information, plan a route or path from a starting point to a destination point, and then drive vehicle 101 based on the planning and control information. Alternatively, perception and planning system 110 may be integrated with vehicle control system 111.

For example, a user as a passenger may specify a starting location and a destination of a trip, for example, via a user interface. Perception and planning system 110 obtains the trip related data. For example, perception and planning system 110 may obtain location and route information from an MPOI server, which may be a part of servers 103-104. The location server provides location services and the MPOI server provides map services and the POIs of certain locations. Alternatively, such location and MPOI information may be cached locally in a persistent storage device of perception and planning system 110.

While autonomous vehicle 101 is moving along the route, perception and planning system 110 may also obtain real-time traffic information from a traffic information system or server (TIS). Note that servers 103-104 may be operated by a third party entity. Alternatively, the functionalities of servers 103-104 may be integrated with perception and planning system 110. Based on the real-time traffic information, MPOI information, and location information, as well as real-time local environment data detected or sensed by sensor system 115 (e.g., obstacles, objects, nearby vehicles), perception and planning system 110 can plan an optimal route and drive vehicle 101, for example, via control system 111, according to the planned route to reach the specified destination safely and efficiently.

Server 103 may be a data analytics system performing machine learning or training services for a variety of clients. In one embodiment, data analytics system 103 includes data collector 121, machine learning engine 122, neural network models generator 123, and neural network models 124. Data collector 121 may collect various training data from a variety of vehicles communicatively coupled to server 103, either autonomous vehicles or regular vehicles driven by human drivers. An example of training data may be image data for image recognition functions. Training data may be compiled into categories and associated with ground true labels. In another embodiment, data collector 121 may download a training data set from an online archive from the world wide web.

Based on the training data collected by data collector 121, machine learning engine 122 may train a set of neural network models 124 for object detection and object classification purposes. For example, machine learning engine 122 may train a deep neural network model (as part of neural network models 124) with training data, such as image/ground true label pairs, to detect objects such as a car, a pedestrian, or a stop sign. In another example, machine learning engine 122 may train a deep neural network model (as part of neural network models 124), such as a deep convolutional neural network (CNN) model, with training data to classify a traffic light as a red light, a yellow light, or a green light. Note that neural network models 124 is not limited to feedforward neural network models or convolutional neural network models but may include radial basis function network models, recurrent neural network models, Kohonen self-organizing network models, etc. Neural network models 124 may include various deep CNN models such as LeNet™, AlexNet™, ZFNet™, GoogLeNet™, VGGNet™, etc.

"Deep" neural network refers to neural networks with multiple inner layers. "Activation function" of a neuron defines the output of that neuron given an input or set of inputs. "Accelerated" refers to a speed up in computational and/or memory performance of a layer of a neural network or of a neural network. "Online" activities refer to activities ADVs perform in real-time to detect or classify an object. "Offline" activities refer to activities a server or an ADV performs in preparation for object detection or classification.

Artificial neural network (ANN) is a computational approach based on a large collection of neural units or neurons, loosely modeling the biological brain with a large collection of neurons connected by axons. Each neuron is connected with many other neurons and the axons or connections can be reinforced or inhibited in their effect on the activation state of connected neurons with learning or training. Each individual neuron may have a function which combines the values of all its inputs together. There may be a threshold function or limiting function on each connection and on the unit itself: such that the signal must surpass the limit before propagating to other neurons. These systems are self-learning and trained, rather than explicitly programmed.

A convolutional neural network (CNN) is a type of feed-forward artificial neural network (ANN) in which the connectivity pattern between its neurons is inspired by the organization of the animal visual cortex. Individual cortical neurons respond to stimuli in a restricted region of space known as the receptive field. The receptive fields of different neurons partially overlap such that they tile the visual field. The response of an individual neuron to stimuli within its receptive field can be approximated mathematically by a convolution operation. A deep CNN is a CNN with multiple inner layers. "Inner layers" of a neural network refers to layers in between the input and the output layers of the neural network.

Training a CNN is complicated by the fact that the distribution of each layer's inputs changes during training, as the parameters of the previous layers change. "Training" a CNN involves iteratively applying inputs to an input layer of the CNN and comparing desired outputs with actual outputs at the output layer of the CNN to calculate error terms. These error terms are used to adjust weights and biases in the hidden layers of the CNN so that the next time around the output values will be closer to the "correct" values. The distribution of inputs of each layers slows down the training, i.e., a lower training rate is required for convergence, and requires a careful parameter initialization, i.e., setting initial weights and biases of activations of the inner layers to specific ranges for convergence. "Convergence" refers to when the error terms reach a minimal value. Training a CNN in mini-batches achieves a better performance.

A batch normalization (batch norm or BN) technique may be applied to mini-batch trainings of a neural network by explicitly forcing activations throughout the neural network to take on a unit Gaussian distribution at each of the input activation layers. Applying this technique usually means inserting a batch norm layer and/or a scaling layer immediately after fully connected layers, or convolutional/deconvolutional layers, and before nonlinearities. A "batch norm" layer refers to a layer that applies a batch norm transformation. A "scaling" layer refers to applying a multiplication and/or a shift factor to an input layer, e.g., $y=Ax+B$, where y is an output layer, A is a multiplication factor, B is a shift, and x is an input layer. The batch normalization technique acts to regularize or normalize a neural network model, by forcing activations throughout the network to take on a unit Gaussian distribution, such that the neural network can afford a higher learning rate and be less careful about parameter initialization. When inferring a probability event, a batch normalized neural network applies the same batch-norm and/or scaling layers acquired by training.

A more complex inference task may require processing of many inner layers. Deep neural network models with additional inner layers increases training time and reduce convergence rate. Batch-norm layers and scaling layers may be introduced at each of the activations to reduce the training time and increase the convergence rate. However, the additional batch-norm and scaling layers decreases inference performance. For example, when an ADV is "online" inferring an event, the same batch-norm and/or scaling layers are also applied by the trained neural network models. To reduce computation and memory requirements of batch-normalized neural network models, such as batch-normalized CNNs, accelerated CNN models may be generated from original CNN models. In one embodiment, for example, neural network models generator 123 may generate an accelerated neural network model based on accelerated layers, whereas the accelerated layers in turn are generated based on groups of convolutional, batch-norm, and/or scaling layers. Server 103 may subsequently update autonomous vehicle 101 with accelerated neural network models, either directly or automatically through network 102.

Figure 3:
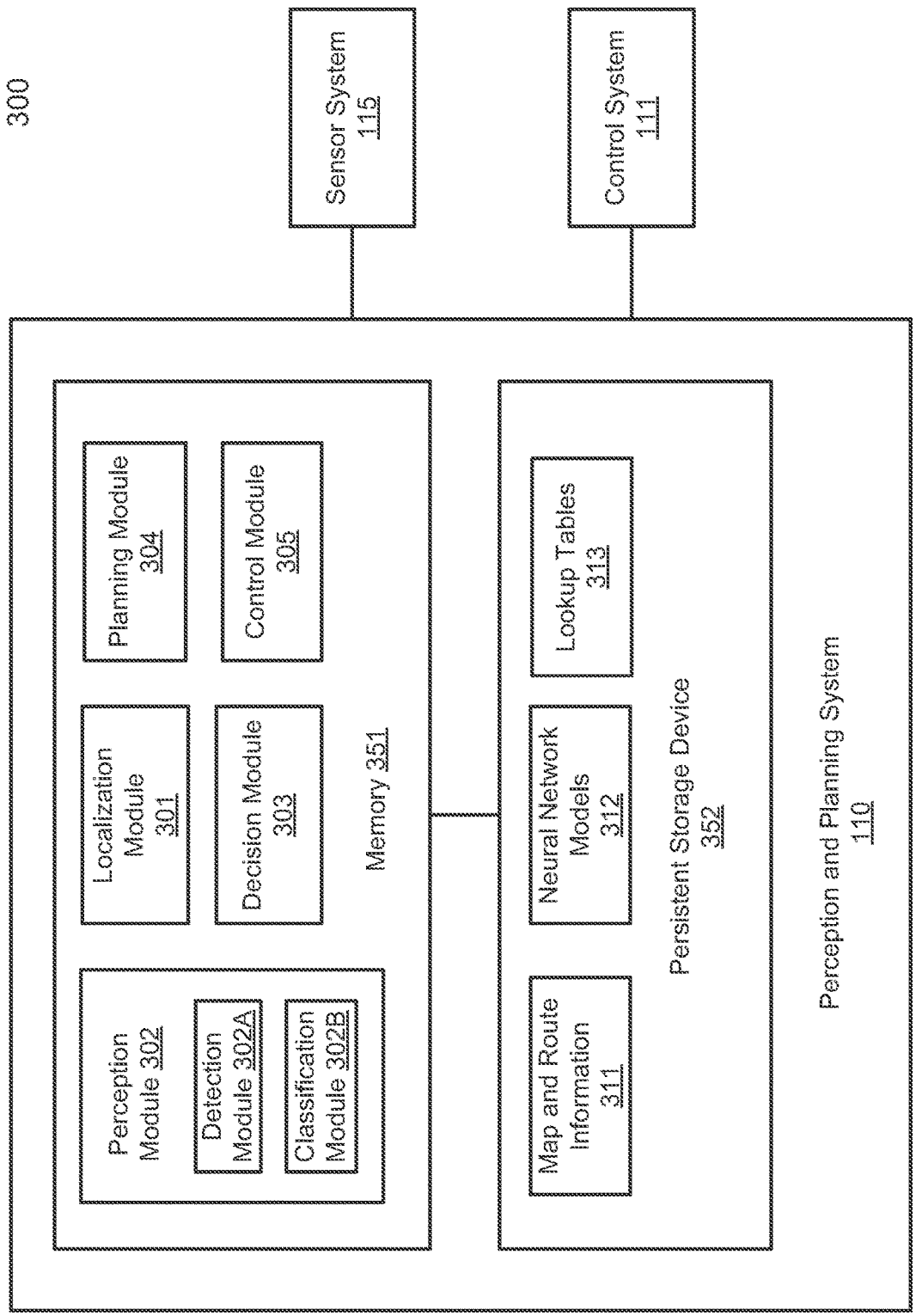
FIG. 3 is a block diagram illustrating an example of a perception and planning system used with an autonomous vehicle according to one embodiment of the invention.

FIG. 3 is a block diagram illustrating an example of a perception and planning system used with an autonomous vehicle according to one embodiment of the invention. System 300 may be implemented as a part of autonomous vehicle 101 of FIG. 1 including, but is not limited to, perception and planning system 110, control system 111, and sensor system 115. Referring to FIG. 3, perception and planning system 110 includes, but is not limited to, localization module 301, perception module 302, decision module 303, planning module 304, and control module 305.

Some or all of modules 301-305 may be implemented in software, hardware, or a combination thereof. For example, these modules may be installed in persistent storage device 352, loaded into memory 351, and executed by one or more processors (not shown). Note that some or all of these modules may be communicatively coupled to or integrated with some or all modules of vehicle control system 111 of FIG. 2. Some of modules 301-305 may be integrated together as an integrated module.

Localization module 301 determines a current location of autonomous vehicle 300 (e.g., leveraging GPS unit 212) and manages any data related to a trip or route of a user. Localization module 301 (also referred to as a map and route module) manages any data related to a trip or route of a user. A user may log in and specify a starting location and a destination of a trip, for example, via a user interface. Localization module 301 communicates with other components of autonomous vehicle 300, such as map and route information 311, to obtain the trip related data. For example, localization module 301 may obtain location and route information from a location server and a map and POI (MPOI) server. A location server provides location services and an MPOI server provides map services and the POIs of certain locations, which may be cached as part of map and route information 311. While autonomous vehicle 300 is moving along the route, localization module 301 may also obtain real-time traffic information from a traffic information system or server.

Based on the sensor data provided by sensor system 115 and localization information obtained by localization module 301, a perception of the surrounding environment is determined by perception module 302. The perception information may represent what an ordinary driver would perceive surrounding a vehicle in which the driver is driving. The perception can include the lane configuration (e.g., straight or curve lanes), traffic light signals, a relative position of another vehicle, a pedestrian, a building, crosswalk, or other traffic related signs (e.g., stop signs, yield signs), etc., for example, in a form of an object.

Perception module 302 may include a computer vision system or functionalities of a computer vision system to process and analyze images captured by one or more cameras in order to identify objects and/or features in the environment of autonomous vehicle. The objects can include traffic signals, road way boundaries, other vehicles, pedestrians, and/or obstacles, etc. The computer vision system may use an object recognition algorithm, video tracking, and other computer vision techniques. In some embodiments, the computer vision system can map an environment, track objects, and estimate the speed of objects, etc. Perception module 302 can also detect objects based on other sensors data provided by other sensors such as a radar and/or LIDAR.

In one embodiment, perception module 302 includes a detection module 302A and a classification module 302B. In one embodiment, detection module 302A may detect an object from collected sensor data such as real-time image data by one or more sensors of sensor system 115. Detection module 302A may detect an object using a trained deep neural network model (as part of neural network models 312). In another embodiment, the trained deep neural network model may be an accelerated neural network model created offline by a data analytics system such as data analytics system 103. In another embodiment, detection module 302A may detect objects by cursory locating the objects at an expected location and/or angle perceived by an ADV via map and route information 311, e.g., traffic light are expected to appear in front of an ADV as the ADV approaches an intersection with a traffic light according to predetermined map information of map and route information 311.

In one embodiment, classification module 302B may classify a detected object of detection module 302A. Classification module 302B looks up, from lookup tables 313, a neural network model (as part of neural network models 312) that is associated with the object detected. Classification module 302B infers a classification probability according to the detected object. For example, a detected object, such as a traffic light, may be classified by classification module 302B. Classification module 302B classifies an object to output a probability event, such as the probabilities that a traffic light is a red light, a yellow light, or a green light.

For each of the objects, decision module 303 makes a decision regarding how to handle the object. For example, for a particular object (e.g., another vehicle in a crossing route) as well as its metadata describing the object (e.g., a speed, direction, turning angle), decision module 303 decides how to encounter the object (e.g., overtake, yield, stop, pass). Decision module 303 may make such decisions according to a set of rules such as traffic rules or driving rules 312, which may be stored in persistent storage device 352.

Based on a decision for each of the objects perceived, planning module 304 plans a path or route for the autonomous vehicle, as well as driving parameters (e.g., distance, speed, and/or turning angle). That is, for a given object, decision module 303 decides what to do with the object, while planning module 304 determines how to do it. For example, for a given object, decision module 303 may decide to pass the object, while planning module 304 may determine whether to pass on the left side or right side of the object. Planning and control data is generated by planning module 304 including information describing how vehicle 300 would move in a next moving cycle (e.g., next route/path segment). For example, the planning and control data may instruct vehicle 300 to move 10 meters at a speed of 30 mile per hour (mph), then change to a right lane at the speed of 25 mph.

Based on the planning and control data, control module 305 controls and drives the autonomous vehicle, by sending proper commands or signals to vehicle control system 111, according to a route or path defined by the planning and control data. The planning and control data include sufficient information to drive the vehicle from a first point to a second point of a route or path using appropriate vehicle settings or driving parameters (e.g., throttle, braking, and turning commands) at different points in time along the path or route.

Note that decision module 303 and planning module 304 may be integrated as an integrated module. Decision module 303/planning module 304 may include a navigation system or functionalities of a navigation system to determine a driving path for the autonomous vehicle. For example, the navigation system may determine a series of speeds and directional headings to effect movement of the autonomous vehicle along a path that substantially avoids perceived obstacles while generally advancing the autonomous vehicle along a roadway-based path leading to an ultimate destination. The destination may be set according to user inputs via user interface system 113. The navigation system may update the driving path dynamically while the autonomous vehicle is in operation. The navigation system can incorporate data from a GPS system and one or more maps so as to determine the driving path for the autonomous vehicle.

Decision module 303/planning module 304 may further include a collision avoidance system or functionalities of a collision avoidance system to identify, evaluate, and avoid or otherwise negotiate potential obstacles in the environment of the autonomous vehicle. For example, the collision avoidance system may effect changes in the navigation of the autonomous vehicle by operating one or more subsystems in control system 111 to undertake swerving maneuvers, turning maneuvers, braking maneuvers, etc. The collision avoidance system may automatically determine feasible obstacle avoidance maneuvers on the basis of surrounding traffic patterns, road conditions, etc. The collision avoidance system may be configured such that a swerving maneuver is not undertaken when other sensor systems detect vehicles, construction barriers, etc. in the region adjacent the autonomous vehicle that would be swerved into. The collision avoidance system may automatically select the maneuver that is both available and maximizes safety of occupants of the autonomous vehicle. The collision avoidance system may select an avoidance maneuver predicted to cause the least amount of acceleration in a passenger cabin of the autonomous vehicle.

Persistent storage device 352 can include map and route information 311, neural network models 312, and lookup tables 313. Map and route information can be used to determine a sequence of navigation operations to arrive and a destination. Navigation operations can be expressed as arcs in a graph with weights and attributes that characterize the route, such as speed, traffic, signals, road type, etc. Neural network models 312 may include various types or variations of deep neural network models to perform specific trained functions. Lookup table 313 may associate objects to particular neural network models (as part of neural network models 312). In one embodiment, neural network models 312 can be downloaded as needed from a server, e.g. server 103 or 104, via a wireless network.

Figure 4:
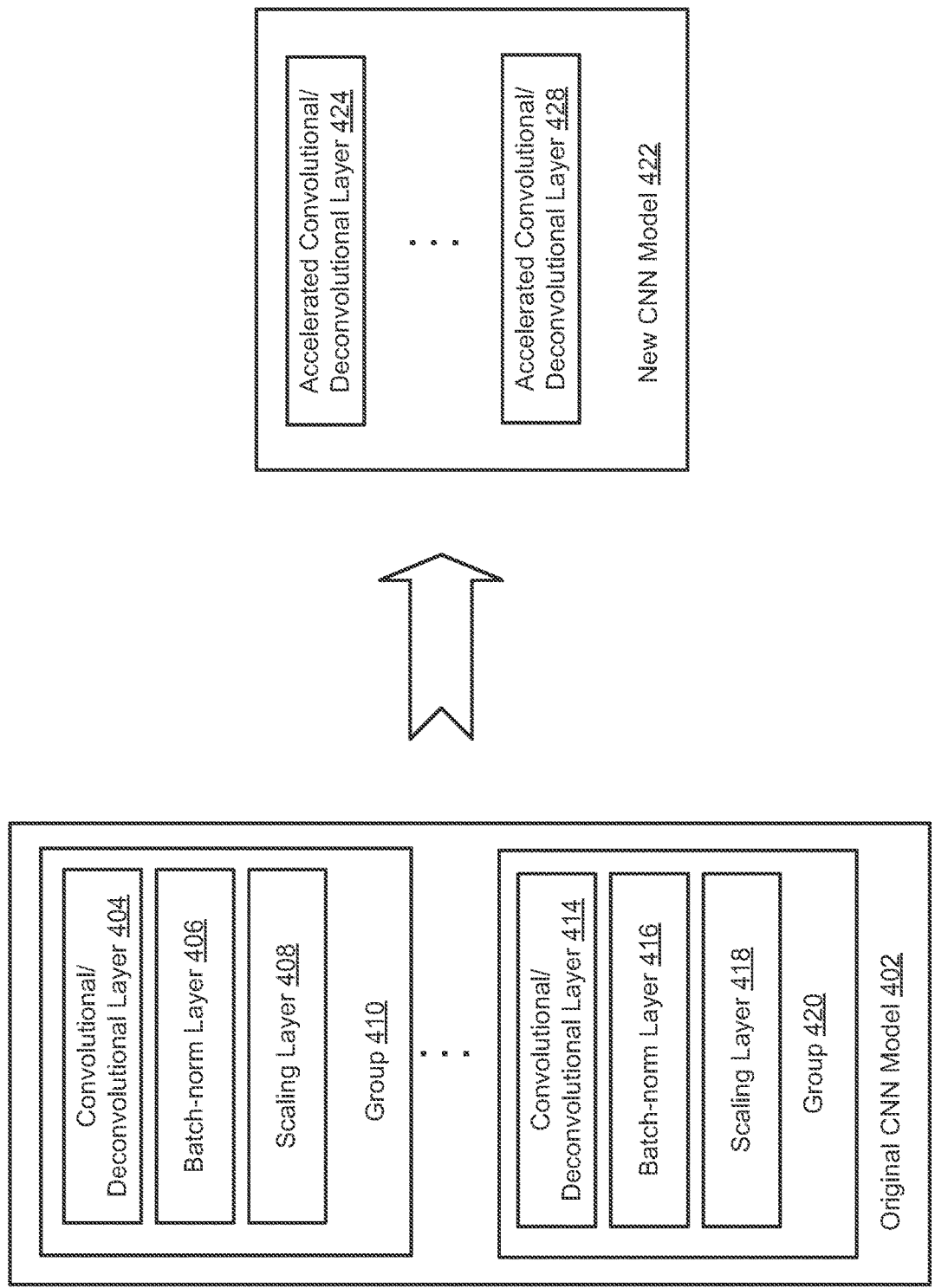
FIG. 4 is a block diagram illustrating a new CNN model generated from an original CNN model for an autonomous vehicle according to one embodiment of the invention.

FIG. 4 is a block diagram illustrating a new (or accelerated) CNN model 422 generated from an original CNN model 402 for an autonomous vehicle according to one embodiment of the invention. Original CNN model 402 may be a batch normalized neural network trained by a machine learning engine, such as machine learning engine 122 of server 103. Original CNN model 402 may include many groups of inner layers. FIG. 4 illustrates an original CNN model 402 having a group 410 and a group 420. Group 410 has convolutional/deconvolutional layer 404, batch-norm layer 406, and scaling layer 408. Group 420 has convolutional/deconvolutional layer 414, batch-norm layer 416, and scaling layer 418. In another embodiment, group 410 may only contain a convolutional/deconvolutional layer 404 and a batch-norm layer 406. In one embodiment, new (or accelerated) CNN model 422 may contain many accelerated convolutional/deconvolutional layers, such as accelerated convolutional/deconvolutional layers 424-428. Note, CNN model 402 is not limited to convolutional neural network models, but may be a variety of neural network models, for example, recurrent neural network models.

According to some embodiments, a server/data analytics system may generate, while offline, an accelerated deep CNN such as new CNN model 422 from an original CNN model 402 having one or more batch-norm layers. For example, the system extracts a number of first groups of layers, for example, group 410 (if this group contains a convolutional layer), from original CNN model 402, each group of the number of first groups having a first convolutional layer and a first batch-norm layer. For example, group 410 has convolutional layer 404 and batch-norm layer 406. For each of first groups, the system calculates a first scale vector and a first shift vector based on the first batch-norm layer and generates a first accelerated convolutional layer. For example, for group 410, the system calculates a first scale vector and a first shift vector based on batch-norm layer 406 and generates accelerated convolutional layer 424. The system generates new CNN model 422 based on accelerated convolutional layer 424, accelerated convolutional layer 424 corresponding to group 410, such that new CNN model 422 is utilized subsequently to classify an object perceived by an autonomous driving vehicle. In one embodiment, for each of the first groups, the system calculates a second scale and a second shift vector based on the first batch-norm layer and a first scaling layer of the corresponding first groups; and generates the second convolutional layer based on the second scale vector, the second shift vector, and the first convolutional layer. For example, for group 410, the system calculates a second scale vector and a second shift vector based on batch-norm layer 406 and scaling layer 408. The system then generates accelerated convolutional layer 424 based on the convolutional layer 404, the second scale vector and the second shift vector.

In one embodiment, the system extracts a number of second groups of layers from the first CNN model, each group of the second groups having a first deconvolutional layer and a second batch-norm layer. For example, the system extracts a number of second groups of layers, for example, group 420 (if this group contains a deconvolutional layer), from original CNN model 402, each group of the first groups having a first deconvolutional layer and a second batch-norm layer. For example, group 420 has deconvolutional layer 414 and batch-norm layer 416. For each group of the second groups, the system calculates a third scale vector and a third shift vector based on the second batch-norm layer, and generates a second deconvolutional layer based on the calculated vectors and the first deconvolutional layer, such that the second CNN model includes the second deconvolutional layer corresponding to the second group. For example, for group 420, the system calculates a third scale vector and a third shift vector based on batch-norm layer 416 and generates accelerated deconvolutional layer 428. The system generates new CNN model 422 based on accelerated convolutional layer 428, accelerated convolutional layer 428 corresponding to group 420. In another embodiment, for each of the second groups, the system calculates a fourth scale vector and a fourth shift vector based on a second scaling layer of the corresponding second groups; and generates the second deconvolutional layer based on the calculated vectors, and the first deconvolutional layer. For example, for group 420 (group 420 has a deconvolutional layer), the system calculates a fourth scale vector and a fourth shift vector based on batch-norm layer 416 and scaling layer 418. The system then generates accelerated convolutional layer 428 based on the deconvolutional layer 414 and the fourth scale vector and the fourth shift vector.

In one embodiment, the first groups of layers are extracted from a first CNN model after the first CNN model is trained with training data. In one embodiment, the first convolutional layer and the first batch-norm layer are consecutive layers. The accelerated neural network models 124 may then be uploaded onto the ADVs, which can be utilized in real-time for object classification. In one embodiment, the object to be classified is an image having a green, yellow, and red traffic light. In another embodiment, the first probability event is a probability event that the object to be classified is a green light, a yellow light, or a red light.

In one embodiment, the first convolutional layer has a multi-dimensional input. In another embodiment, first batch-norm layer is calculated scalarly for each dimension of the multi-dimensional input. In another embodiment, the first scale vector and the first shift vector are calculated based on means and standard deviations of each dimension of the multi-dimensional input. In another embodiment, the means and the standard deviations are calculated for each dimension of the multi-dimensional input independently.

Figure 5:
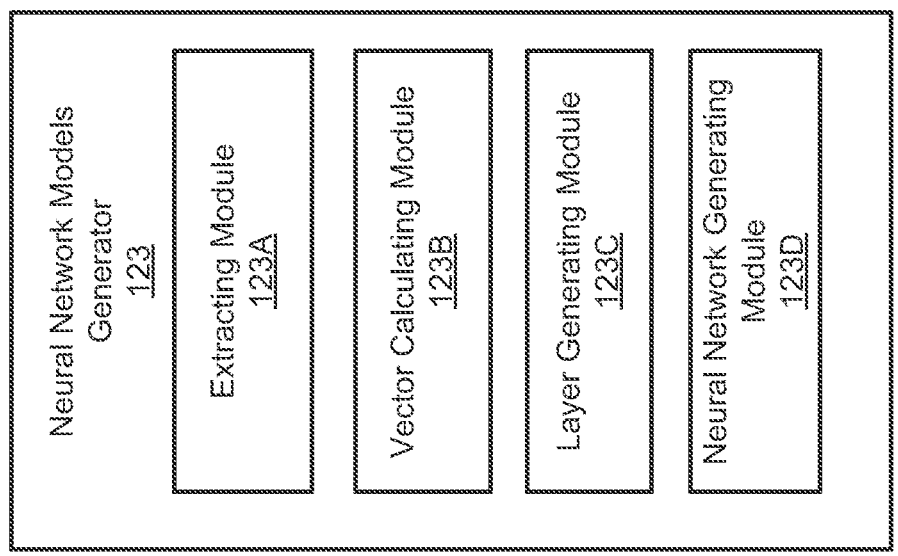
FIG. 5 is a block diagram illustrating an example of a neural network models generator for an autonomous vehicle according to one embodiment of the invention.

FIG. 5 illustrates an example of a neural network models generator (such as neural network models generator 123) of an autonomous vehicle according to one embodiment of the invention. For example, neural network models generator 123 can include extracting module 123A, vector calculating module 123B, layer generating module 123C, and neural network generating module 123D. When a batch normalization transformation is applied to a deep neural network model by combining or adding batch-norm layers and/or scaling layers to inner or intermediate activation layers of the original deep neural network to improve training flexibilities, the trained deep neural network model performing inference tasks retains many of the batch-norm and/or scaling layers of the neural network model. A trained batch-normalized deep neural network may be accelerated by combining activation layers with batch-norm layers by, for example, neural network models generator 123 of server 103.

Referring to FIG. 5, weights and biases of activation layers of a trained CNN model may be extracted by extracting module 123A. A trained CNN model may be original CNN model 502 of FIG. 4. For example, extracting module 123A may extract weights and bias of a convolutional/deconvolutional layer in the form of:

$$y_1 = \alpha_1 x_1 + \beta_1;$$

where $y_1$ is the output and $x_1$ is the input to a convolutional/deconvolutional layer, $\alpha_1$ is a weight, and $\beta_1$ is a bias of the layer. In another example, extracting module 123A may extract a mean and a standard deviation value associated with the batch-norm layer in the form of:

$$y_2 = \frac{y_1 - \text{mean}(y_1)}{\text{std}(y_1)};$$

where $y_1$ is the input of an batch-norm layer or the output of a convolutional/deconvolutional layer, mean($y_1$) is a mean of y1, std($y_1$) is a standard deviation of $y_1$, and $y_2$ is an output of the batch-norm layer. Note, the mean and standard deviation are known values (e.g., they do not depend on the value $y_1$) for a trained deep neural network.

In another example, extracting module 123A may extract a scale/shift factor of a scaling layer in the form of:

$$y_3 = \alpha_2 y_2 + \beta_2;$$

where $y_2$ is the input of an scaling layer or the output of a batch-norm layer, $y_3$ is the output of the scaling layer, and $\alpha_2$ is a scale factor and $\beta_2$ is a shift factor of the scaling layer. In the above examples, the extracted parameters may correspond to any single activation of a trained deep CNN model.

Figure 6A:
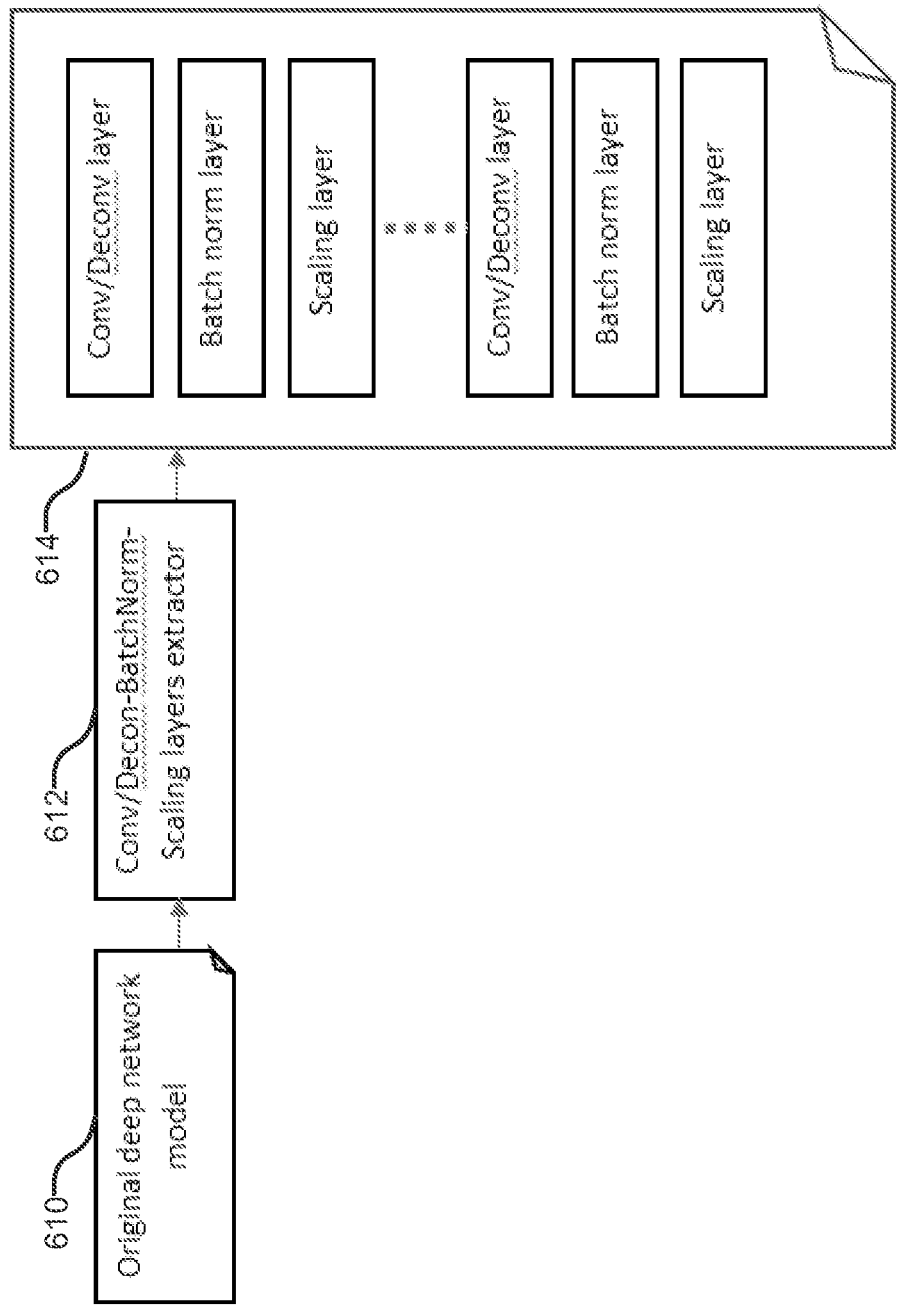
FIG. 6A is a block diagram illustrating an example of a layers extraction from an original deep neural network model according to one embodiment of the invention.

FIG. 6A is a block diagram illustrating an example of a layers extraction from an original deep neural network model according to one embodiment. A trained original deep neural network model, such as original deep neural network model 610 is input to a Conv/Deconv-BatchNorm-Scaling layers extractor 612 (may be performed by extracting module 123A of FIG. 5). Conv/Deconv-BatchNorm-Scaling layers extractor 612 extracts groups 614. Groups 614 may have many groups of convolutional/deconvolutional, batch norm, and scaling layers of original deep neural network model 610.

Figure 6B:
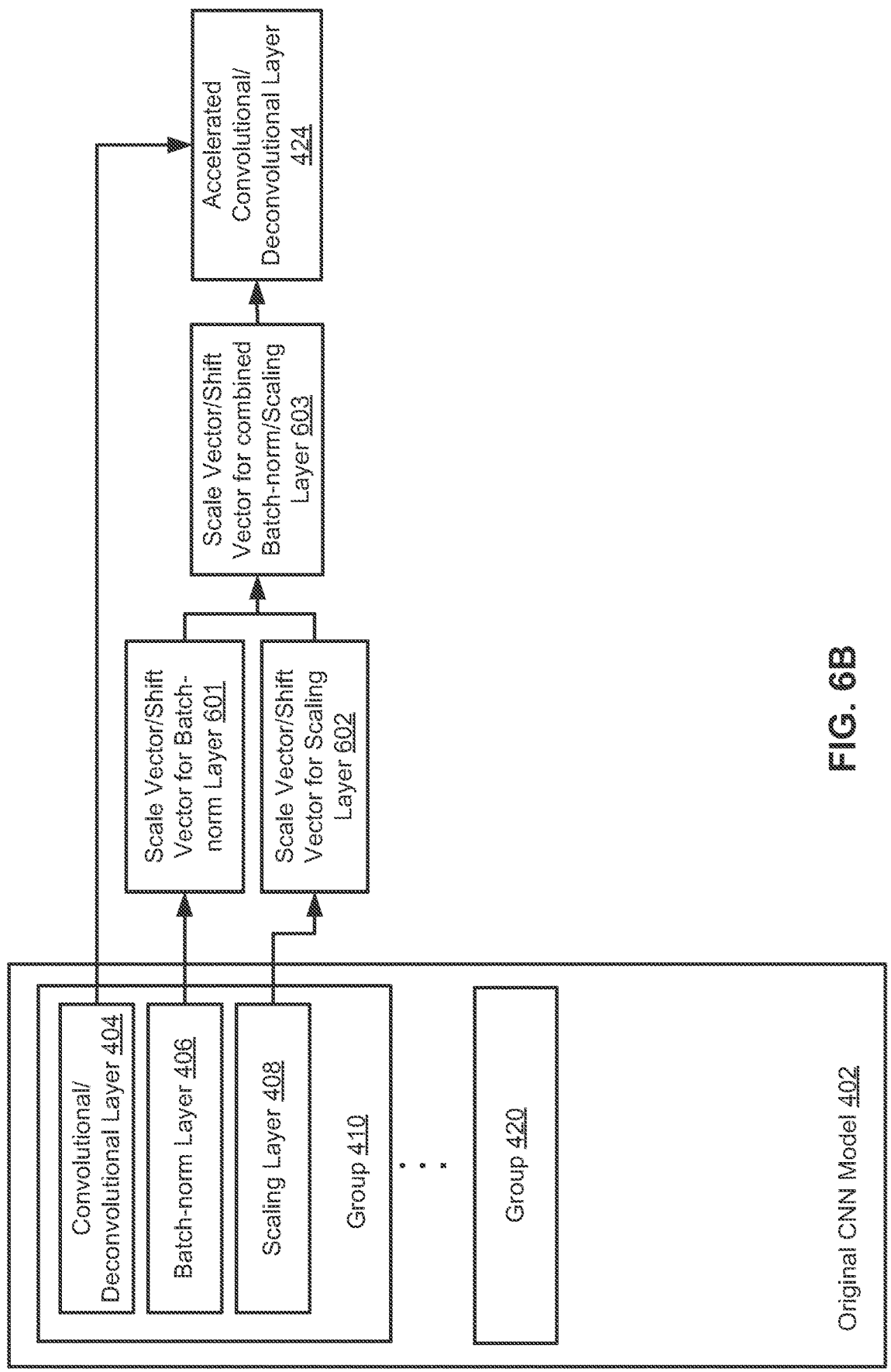
FIG. 6B is a block diagram illustrating an example of an accelerated convolutional/deconvolutional layers generation from an original deep neural network model according to one embodiment of the invention.

FIG. 6B is a block diagram illustrating an example of accelerated convolutional/deconvolutional layers generation from an original deep neural network model according to one embodiment. A trained deep neural network model, original CNN model 402 includes group 410 to group 420. Although there are only two groups shown, more groups may be included in the original model. Each groups 410 includes a convolutional or deconvolution layer, a batch-norm layer, and a scaling layer. In this example, group 410 includes convolutional or deconvolutional layer 404, batch-norm layer 406, and scaling layer 408. Similarly, other groups such as group 420 may include the same layers. Scale vector and/or shift vector for batch-norm layer 601 is calculated from batch-norm layer 406. Scale vector and/or shift vector for scaling layer 602 is calculated from scaling layer 408. Scale vector and/or shift vector for batch-norm layer 601 and scale vector and/or shift vector for scaling layer 602 is combined into scale vector and/or shift vector for combined batch-norm/scaling layer 603. Accelerated convolutional/deconvolutional layer 424 is generated from scale vector and/or shift vector for combined batch-norm/scaling layer 603 and convolutional/deconvolutional layer 404. In another embodiment, accelerated convolutional/deconvolutional layer 424 may be generated from scale vector and/or shift vector for batch-norm 601 and convolutional/deconvolutional layer 404.

Referring back to FIG. 5, in one embodiment, because the batch-norm, and scaling layers of a group of layers are linear transformations, vector calculating module 123B may calculate corresponding vectors for these layers. Vector calculating module 123B may calculate an overall scale vector and an overall shift vector for a batch-norm layer or a batch-norm layer and a scaling layer. For example, a scale vector and a shift vector representing a batch-norm layer are of the form:

$$\text{scale vector} = \frac{1}{\text{std}(y_1)}; \text{shift vector} = -\frac{\text{mean}(y_1)}{\text{std}(y_1)}$$

where mean($y_1$) is a mean of output of $y_1$, and std($y_1$) is a standard deviation of $y_1$. A scale vector and a shift vector representing a batch-norm layer and a scaling layer are of the form:

$$\text{scale vector} = \frac{\alpha_2}{std(y_1)}; \text{shift vector} = \beta_2 - \frac{\alpha_2 \text{ mean}(y_1)}{std(y_1)}$$

where mean($y_1$) is a mean of output of $y_1$, std($y_1$) is a standard deviation of $y_1$, and $\alpha_2$ is a scaling factor and $\beta_2$ is a shift factor of the scaling layer. Layer generating module 123C may combine a convolutional/deconvolutional layer with a corresponding scale vector and a shift vector of the group of layers to form an accelerated layer corresponding to a group of layers.

Figure 7A:
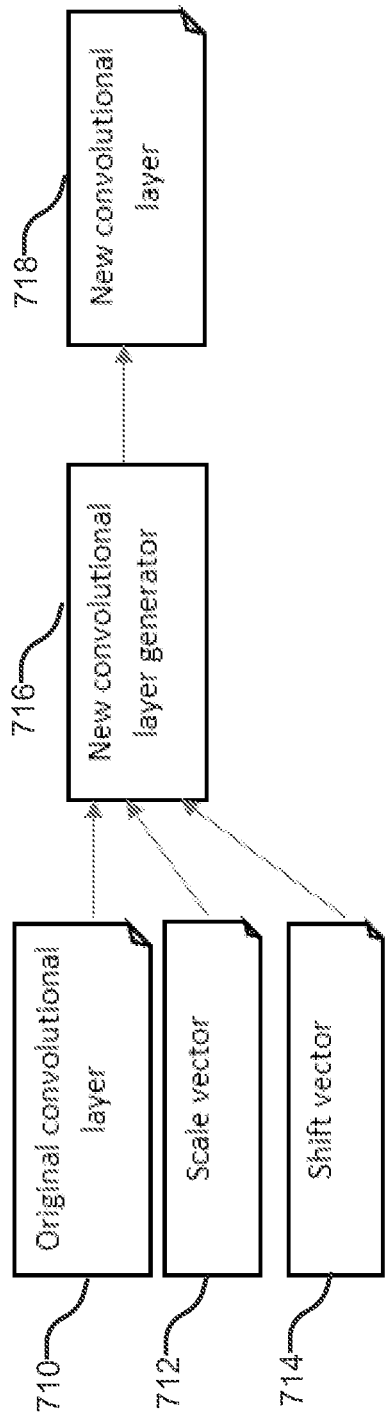
FIG. 7A is a block diagram illustrating an example of an accelerated convolutional layer generation from extracted layers of an original CNN model according to one embodiment of the invention.

FIG. 7A is a block diagram illustrating an example of an accelerated convolutional layer generation from extracted layers of an original CNN model according to one embodiment of the invention. Original convolutional layer 710, scale vector 712, and shift vector 714 are fed to accelerated convolutional layer generator 716 (may be performed by modules such as layer generating module 123C of FIG. 5) to generate accelerated convolutional layer 718.

Figure 7B:
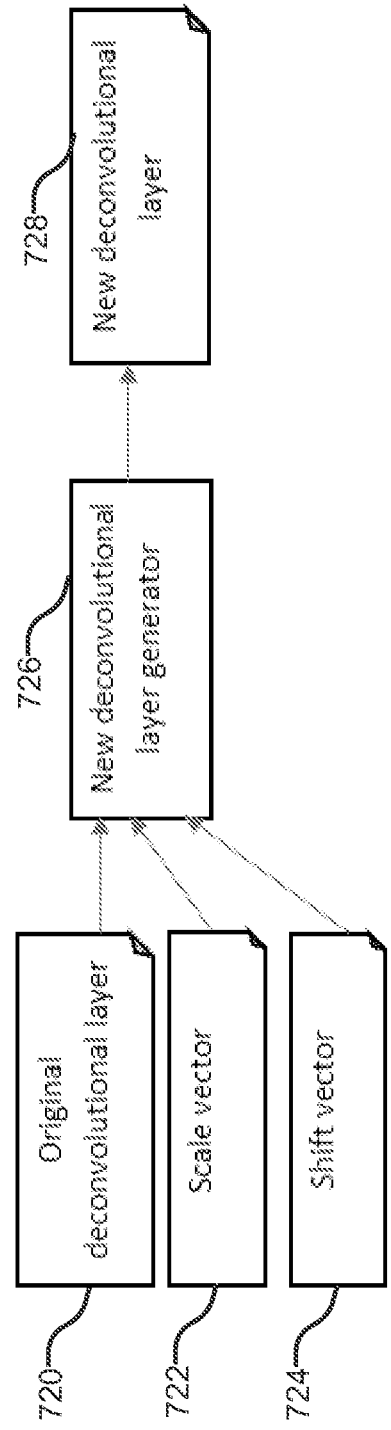
FIG. 7B is a block diagram illustrating an example of an accelerated deconvolutional layer generation from extracted layers of an original CNN model according to one embodiment of the invention.

FIG. 7B is a block diagram illustrating an example of an accelerated deconvolutional layer generation from extracted layers of an original CNN model according to one embodiment of the invention. An original deconvolutional layer 720, scale vector 722, and shift vector 724 are fed to an accelerated deconvolutional layer generator 726 (may be performed by modules such as layer generating module 123C of FIG. 5) to generate accelerated deconvolutional layer 728.

Referring to FIGS. 7A-7B, for example, accelerated convolutional/deconvolutional layer generator 716 may generate an weight and a bias representative of a single accelerated layer of the form:

$$y = \alpha_o x + \beta_o;$$

where x is the input to the accelerated layer, y is the output of the accelerated layer, $\alpha_o$ is the weight, and $\beta_o$ is the bias of the accelerated layer. The accelerated layer may represent a group of layers of an original CNN model (e.g., original convolutional/deconvolutional layer, batch-norm layer, and scale layer).

In one embodiment, accelerated convolutional layer 718 (or accelerated deconvolutional layer 728) is combined from convolutional layer 710 (or deconvolutional layer 720) and scale vector 712 (or scale vector 722) representing corresponding batch-norm layers such that:

$$\alpha_o = \frac{\alpha_1}{std(y_1)}; \text{ and } \beta_o = \frac{\beta_1}{std(y_1)} - \frac{\text{mean}(y_1)}{std(y_1)};$$

where $\alpha_0$ is a weight, and $\beta_0$ is a bias of accelerated convolutional layer 718 (or accelerated deconvolutional layer 728), $y_1$ is the output, $\alpha_1$ is a weight and $\beta_1$ is a bias of convolutional layer 710 (or deconvolutional layer 720), mean($y_1$) is a mean of output of $y_1$, and std($y_1$) is a standard deviation of $y_1$. Note, once a CNN model is trained, mean($y_1$) and std($y_1$) are fixed constants and do not depend on $y_1$. In another embodiment, multiple accelerated layers may be generated from groups of convolutional/deconvolutional and batch-norm layers of a trained CNN model. In another embodiment, an accelerated CNN model is generated based on the generated accelerated layers, such that the accelerated CNN model is utilized subsequently to classify an object perceived by an autonomous driving vehicle.

In one embodiment, accelerated convolutional layer 718 (or accelerated deconvolutional layer 728) is combined from convolutional layer 710 (or deconvolutional layer 720), scale vector 712 (or scale vector 722), and shift vector 714 (or shift vector 724) in the form of:

$$\alpha_o = \frac{\alpha_1 \alpha_2}{std(y_1)}; \text{ and } \beta_o = \beta_2 + \frac{\alpha_2 \beta_1}{std(y_1)} - \frac{\alpha_2 \text{ mean}(y_1)}{std(y_1)};$$

where $\alpha_0$ is a weight, and $\beta_0$ is a bias of accelerated convolutional layer 718 (or accelerated deconvolutional layer 728), $y_1$ is the output, $\alpha_1$ is a weight, and $\beta_1$ is a bias of convolutional layer 710 (or deconvolutional layer 720), mean($y_1$) is a mean of output of $y_1$, std($y_1$) is a standard deviation of $y_1$, and $\alpha_2$ is a scaling factor and $\beta_2$ is a shift factor of a scaling layer.

Note that once a CNN model is trained, mean($y_1$) and std($y_1$) are fixed constants and do not depend on $y_1$. In another embodiment, multiple accelerated layers, such as accelerated convolutional/deconvolutional layers 524-528 of FIG. 5, may be generated from groups of convolutional/deconvolutional, batch-norm, and scaling layers of a trained CNN model. In another embodiment, an accelerated CNN model, such as new CNN Model 522 of FIG. 5, may be generated by neural network generating module 123D of FIG. 3, based on corresponding accelerated layers, such that the accelerated CNN model is utilized subsequently to classify an object perceived by an autonomous driving vehicle.

Note that an input and output of a layer in a CNN model is a multi-dimensional input and output. Also note that the above processes may be performed by a data analytics system such as data analytics system 103 offline to convert each group of layers of an original CNN model into a single layer and to generate a new CNN model. The new CNN model is then uploaded onto an ADV and utilized to classify objects captured by sensors of the ADV at real-time. Each type of objects may be classified by a specific CNN model.

Figure 8:
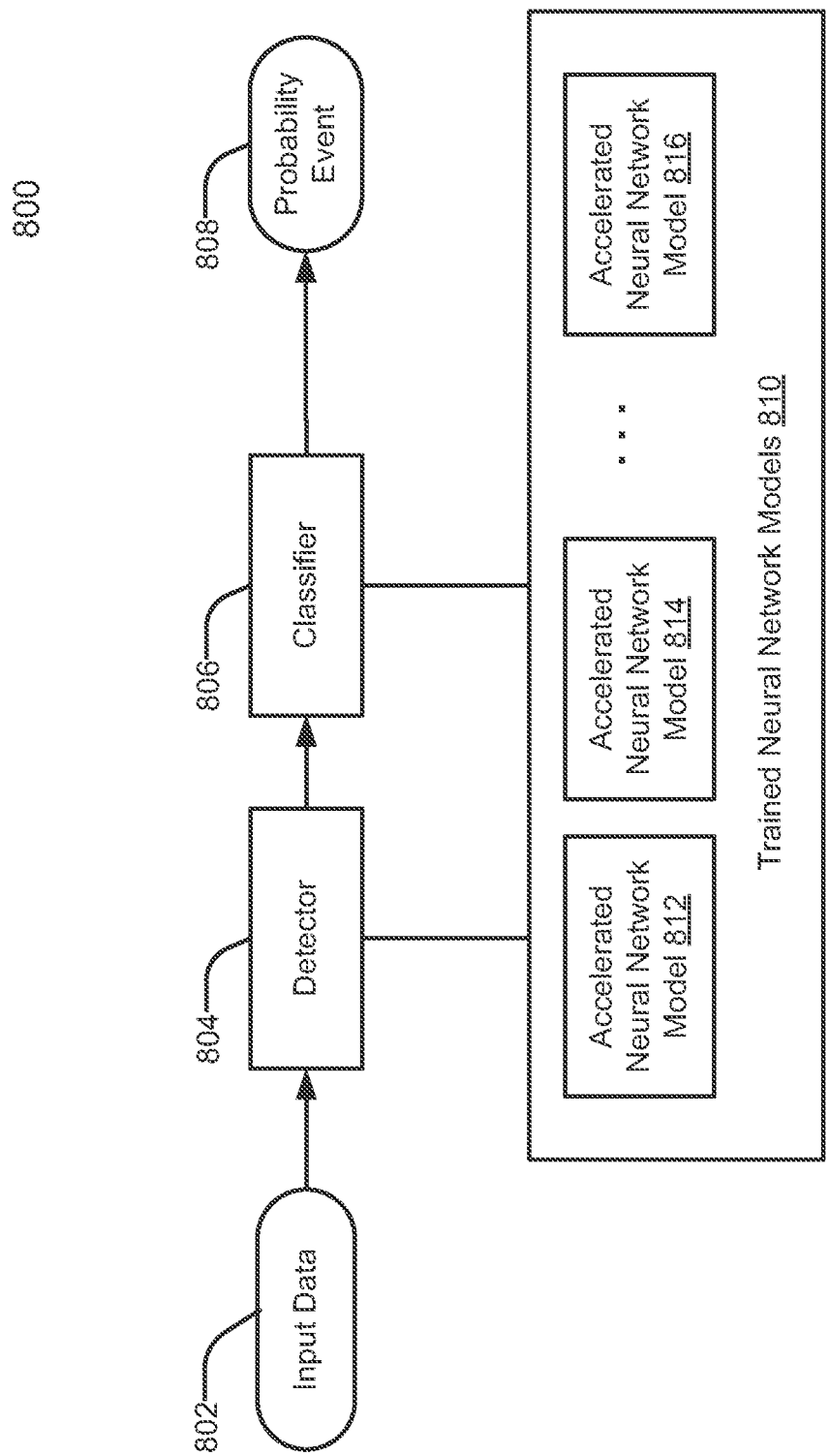
FIG. 8 is a block diagram illustrating an example of a perception module detecting and classifying perceived objects according to one embodiment of the invention.

FIG. 8 is a block diagram illustrating an example of a perception module 800 according to one embodiment of the invention. Perception module 800 may be perception module 302 of FIG. 3. Perception module 800 may include detector 804 and classifier 806. Detector 804 and classifier 806 are communicatively coupled to trained neural network models 810. Trained neural network models 810 may include accelerated neural network models 812-816. In one embodiment, an ADV may receive input data 802 (sensor data such as image data captured by a camera) at detector 804 of perception module 800.

Detector 804 detects one or more types of object(s) from the input data. The perception module 800 looks up in a lookup table or other data structures based on the type of detected object(s) to determine accelerated neural network models which may be used to classify the type of detected object(s). A corresponding accelerated neural network model (as part of trained neural network models 810) is subsequently used by classifier 806 to classify detected object(s) to infer probability event 808. For example, detector 804 may detect an object to be a traffic light. A corresponding accelerated CNN model 812 is retrieved and classifier 806 classifies the traffic light with the corresponding accelerated CNN model 812 to infer probability event

808. Probability 808 may include probabilities that the detected object is a red light, a yellow light, or a green light.

Figure 9:
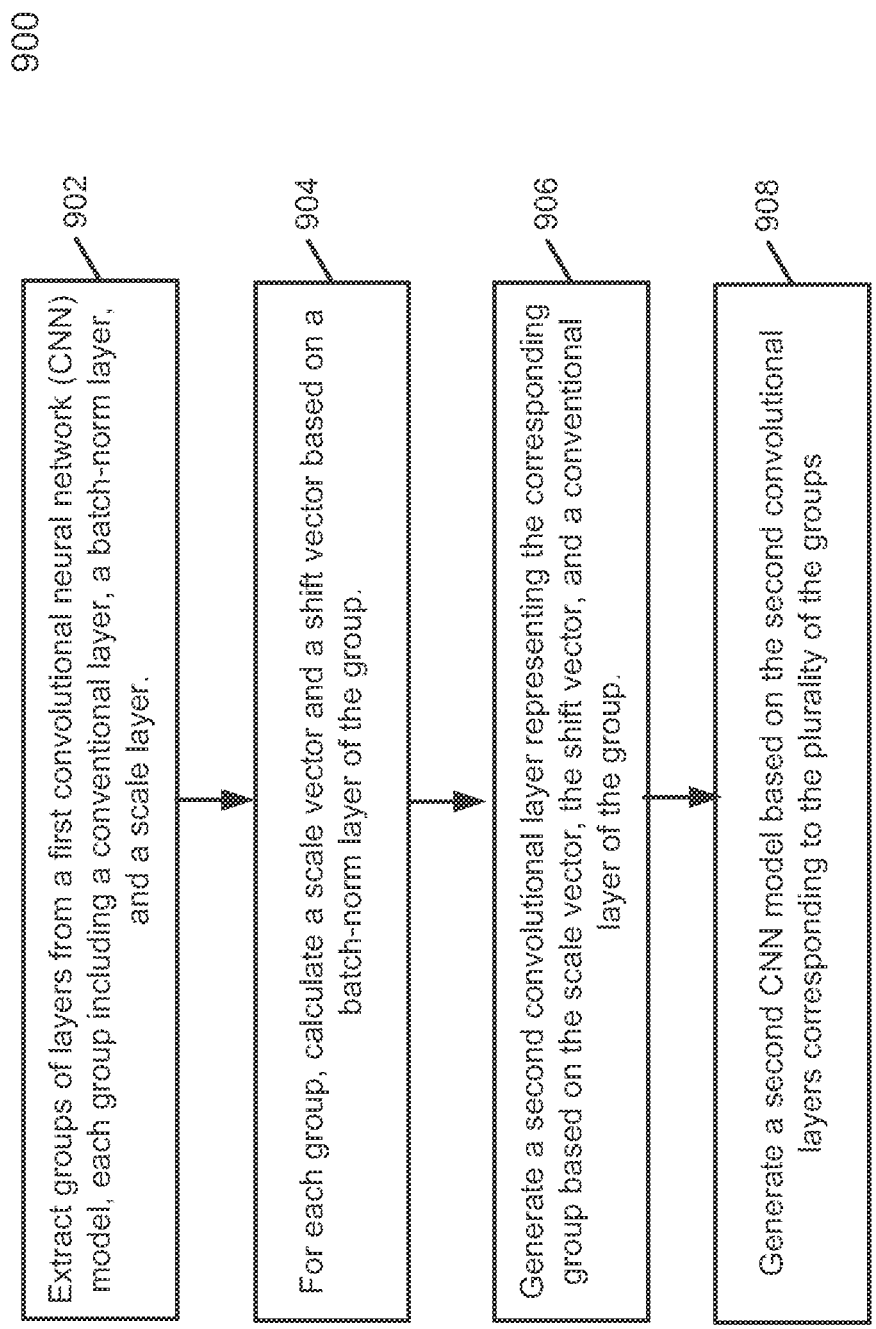
FIG. 9 is a flow diagram illustrating an overview of a method of generating a new CNN from an original CNN according to one embodiment of the invention.

FIG. 9 is a flow diagram illustrating a method to generate a new CNN model from an original CNN model according to one embodiment of the invention. Process 900 may be performed by processing logic which may include software, hardware, or a combination thereof. For example, process 900 may be performed by a data analytics system such as data analytics system 103 (e.g., offline). The new CNN model can then be utilized by an ADV to classify an object at real-time. Referring to FIG. 9, at block 902, processing logic extracts a first groups of layers from a first convolutional neural network (CNN) model, each first group having a first convolutional layer and a first batch-norm layer. At block 904, for each of the first groups, processing logic calculates a first scale vector and a first shift vector based on the first batch-norm layer. At block 906, processing logic generates a second convolutional layer representing the corresponding group based on the first convolutional layer and the first scale and the first shift vector. At block 908, processing logic generates a second CNN model based on the second convolutional layer corresponding to the plurality of the groups. The second CNN model is utilized subsequently to classify an object perceived by an autonomous driving vehicle.

In one embodiment, for each of the first groups, the system calculates a second scale vector and a second shift vector based on the first batch-norm layer and a first scaling layer of the corresponding group; and generates the second convolutional layer based on the second scale vector, the second shift vector, and the first convolutional layer.

In one embodiment, the system extracts a plurality of second groups of layers from the first CNN model, each second group having a first deconvolutional layer and a second batch-norm layer. For each of the second groups, the system calculates a third scale vector and a third shift vector based on the second batch-norm layer, and generates a second deconvolutional layer based on the third scale vector, the third shift vector and the second batch-norm layer, such that the second CNN model includes the second deconvolutional layers corresponding to the second group. In another embodiment, for each of the second groups, the system calculates a third scale vector and a third shift vector based on a second scaling layer of the corresponding second groups; and generates the second deconvolutional layer based on the third scale vector, the third shift vector, and the first deconvolutional layer.

In one embodiment, the first groups of layers are extracted from a first CNN model after the first CNN model is trained with training data. In one embodiment, the first convolutional layer and the first batch-norm layer are consecutive layers.

In one embodiment, the object to be classified is an image having a green, yellow, and red traffic light. In another embodiment, the first probability event is a probability event that the object to be classified is a green light, a yellow light, or a red light.

In one embodiment, the first convolutional layer has a multi-dimensional input. In another embodiment, the first scale vector and the first shift vector are calculated scalarly for each dimension of the multi-dimensional input. In another embodiment, the first scale vector and the first shift vector are calculated based on means and standard deviations of each dimension of the multi-dimensional input. In another embodiment, the means and the standard deviations are calculated for each dimension of the multi-dimensional input independently.

Note that some or all of the components as shown and described above may be implemented in software, hardware, or a combination thereof. For example, such components can be implemented as software installed and stored in a persistent storage device, which can be loaded and executed in a memory by a processor (not shown) to carry out the processes or operations described throughout this application. Alternatively, such components can be implemented as executable code programmed or embedded into dedicated hardware such as an integrated circuit (e.g., an application specific IC or ASIC), a digital signal processor (DSP), or a field programmable gate array (FPGA), which can be accessed via a corresponding driver and/or operating system from an application. Furthermore, such components can be implemented as specific hardware logic in a processor or processor core as part of an instruction set accessible by a software component via one or more specific instructions.

Figure 10:
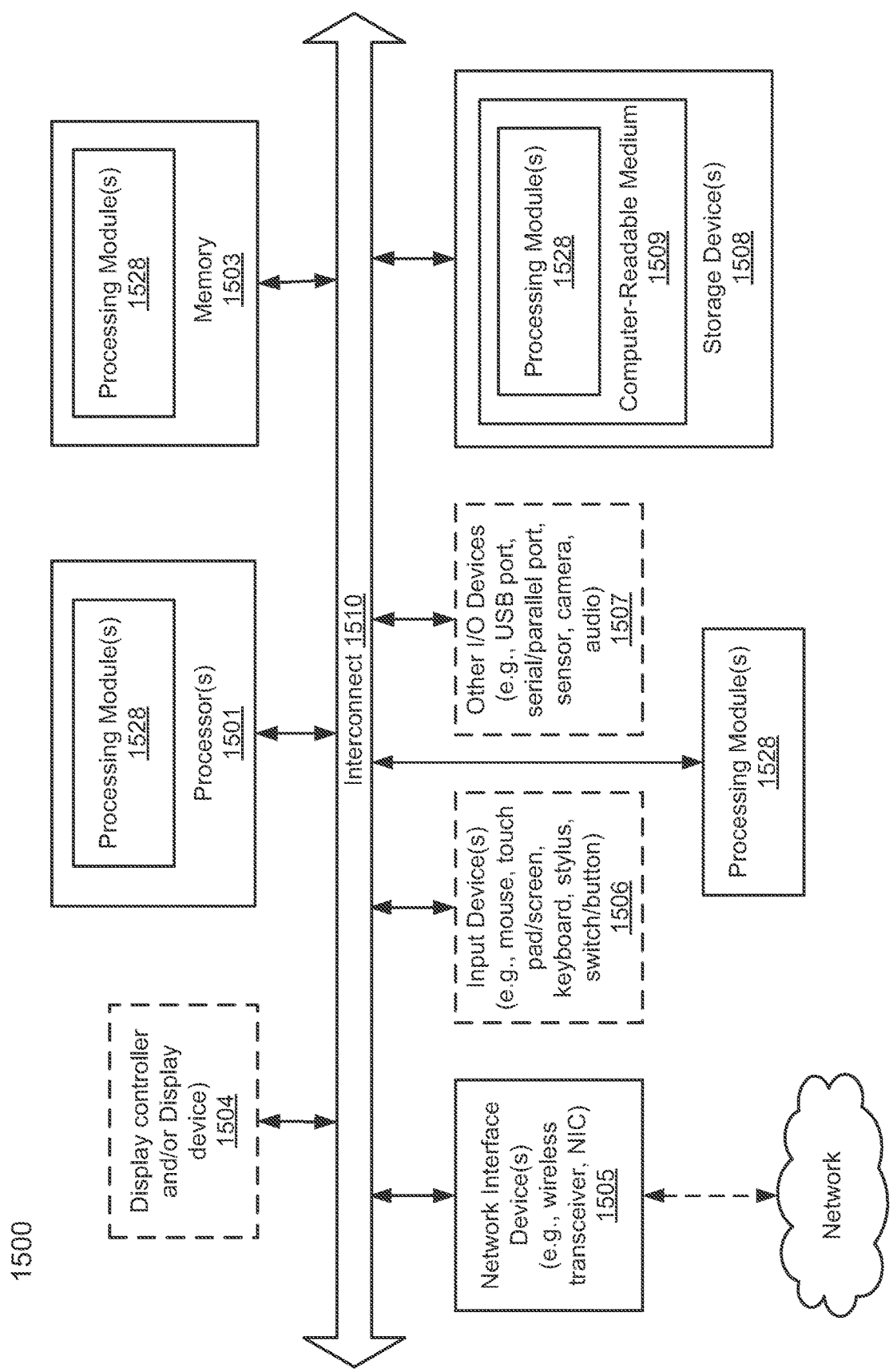
FIG. 10 is a block diagram illustrating a data processing system according to one embodiment.

FIG. 10 is a block diagram illustrating an example of a data processing system which may be used with one embodiment of the invention. For example, system 1500 may represent any of data processing systems described above performing any of the processes or methods described above, such as, for example, any of servers 103-104 of FIG. 1. System 1500 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system.

Note also that system 1500 is intended to show a high level view of many components of the computer system. However, it is to be understood that additional components may be present in certain implementations and furthermore, different arrangement of the components shown may occur in other implementations. System 1500 may represent a desktop, a laptop, a tablet, a server, a mobile phone, a media player, a personal digital assistant (PDA), a Smartwatch, a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 1500 includes processor 1501, memory 1503, and devices 1505-1508 via a bus or an interconnect 1510. Processor 1501 may represent a single processor or multiple processors with a single processor core or multiple processor cores included therein. Processor 1501 may represent one or more general-purpose processors such as a microprocessor, a central processing unit (CPU), or the like. More particularly, processor 1501 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 1501 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a co-processor, an embedded processor, or any other type of logic capable of processing instructions.

Processor 1501, which may be a low power multi-core processor socket such as an ultra-low voltage processor, may act as a main processing unit and central hub for communication with the various components of the system. Such processor can be implemented as a system on chip (SoC). Processor 1501 is configured to execute instructions for performing the operations and steps discussed herein. System 1500 may further include a graphics interface that communicates with optional graphics subsystem 1504, which may include a display controller, a graphics processor, and/or a display device.

Processor 1501 may communicate with memory 1503, which in one embodiment can be implemented via multiple memory devices to provide for a given amount of system memory. Memory 1503 may include one or more volatile storage (or memory) devices such as random access memory (RAM), dynamic RAM (DRAM), synchronous DRAM (SDRAM), static RAM (SRAM), or other types of storage devices. Memory 1503 may store information including sequences of instructions that are executed by processor 1501, or any other device. For example, executable code and/or data of a variety of operating systems, device drivers, firmware (e.g., input output basic system or BIOS), and/or applications can be loaded in memory 1503 and executed by processor 1501. An operating system can be any kind of operating systems, such as, for example, Robot Operating System (ROS), Windows® operating system from Microsoft®, Mac OS®/iOS® from Apple, Android® from Google®, LINUX, UNIX, or other real-time or embedded operating systems.

System 1500 may further include IO devices such as devices 1505-1508, including network interface device(s) 1505, optional input device(s) 1506, and other optional IO device(s) 1507. Network interface device 1505 may include a wireless transceiver and/or a network interface card (NIC). The wireless transceiver may be a WiFi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 1506 may include a mouse, a touch pad, a touch sensitive screen (which may be integrated with display device 1504), a pointer device such as a stylus, and/or a keyboard (e.g., physical keyboard or a virtual keyboard displayed as part of a touch sensitive screen). For example, input device 1506 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 1507 may include an audio device. An audio device may include a speaker and/or a microphone to facilitate voice-enabled functions, such as voice recognition, voice replication, digital recording, and/or telephony functions. Other IO devices 1507 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. Devices 1507 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 1510 via a sensor hub (not shown), while other devices such as a keyboard or thermal sensor may be controlled by an embedded controller (not shown), dependent upon the specific configuration or design of system 1500.

To provide for persistent storage of information such as data, applications, one or more operating systems and so forth, a mass storage (not shown) may also couple to processor 1501. In various embodiments, to enable a thinner and lighter system design as well as to improve system responsiveness, this mass storage may be implemented via a solid state device (SSD). However in other embodiments, the mass storage may primarily be implemented using a hard disk drive (HDD) with a smaller amount of SSD storage to act as a SSD cache to enable non-volatile storage of context state and other such information during power down events so that a fast power up can occur on re-initiation of system activities. Also a flash device may be coupled to processor 1501, e.g., via a serial peripheral interface (SPI). This flash device may provide for non-volatile storage of system software, including BIOS as well as other firmware of the system.

Storage device 1508 may include computer-accessible storage medium 1509 (also known as a machine-readable storage medium or a computer-readable medium) on which is stored one or more sets of instructions or software (e.g., module, unit, and/or logic 1528) embodying any one or more of the methodologies or functions described herein. Processing module/unit/logic 1528 may represent any of the components described above, such as, for example, perception module 302. Processing module/unit/logic 1528 may also reside, completely or at least partially, within memory 1503 and/or within processor 1501 during execution thereof by data processing system 1500, memory 1503 and processor 1501 also constituting machine-accessible storage media. Processing module/unit/logic 1528 may further be transmitted or received over a network via network interface device 1505.

Computer-readable storage medium 1509 may also be used to store the some software functionalities described above persistently. While computer-readable storage medium 1509 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of the present invention. The term "computer-readable storage medium" shall accordingly be taken to include, but not be limited to, solid-state memories, and optical and magnetic media, or any other non-transitory machine-readable medium.

Processing module/unit/logic 1528, components and other features described herein can be implemented as discrete hardware components or integrated in the functionality of hardware components such as ASICS, FPGAs, DSPs or similar devices. In addition, processing module/unit/logic 1528 can be implemented as firmware or functional circuitry within hardware devices. Further, processing module/unit/ logic 1528 can be implemented in any combination hardware devices and software components.

Note that while system 1500 is illustrated with various components of a data processing system, it is not intended to represent any particular architecture or manner of interconnecting the components; as such details are not germane to embodiments of the present invention. It will also be appreciated that network computers, handheld computers, mobile phones, servers, and/or other data processing systems which have fewer components or perhaps more components may also be used with embodiments of the invention.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the invention also relate to an apparatus for performing the operations herein. Such a computer program is stored in a non-transitory computer readable medium. A machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments of the present invention are not described with reference to any particular programming language. It will be appreciated that a variety of programming languages may be used to implement the teachings of embodiments of the invention as described herein.

In the foregoing specification, embodiments of the invention have been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A computer-implemented method, the method comprising:
   receiving, at a neural network model generator, a first convolutional neural network (CNN) model as input to the neural network model generator, wherein the first CNN model is a fully trained CNN model;
   extracting, by the neural network model generator, a plurality of first groups of layers and a plurality of second groups of layers from the first convolutional neural network (CNN) model, each group of the plurality of first groups having a first convolutional layer, a first batch-norm layer, and a first scaling layer that is separate from the first batch-norm layer, and each group of the plurality of second groups having a first deconvolutional layer and a second batch-norm layer;
   for each group of the plurality of first groups,
      calculating, by the neural network model generator, a first scale vector and a first shift vector based on the first batch-norm layer, wherein the first scale vector and the first shift vector are calculated scalarly for each dimension of a multi-dimensional input of the first convolutional layer,
      calculating a second scale vector and a second shift vector based on the first scaling layer,
      combining the first scale vector and the second scale vector into a combined scale vector, and the first shift vector and the second shift vector into a combined shift vector, wherein each of the first scale vector and the first shift vector is calculated from the first batch-norm layer, and wherein each of the second scale vector and the second shift vector is calculated from the first scaling layer, and
      generating, by the neural network model generator, a second convolutional layer representing the corresponding group of the plurality of first groups based on the first convolutional layer, the combined scale vector, and the combined shift vector;
   for each group of the plurality of second groups,
      calculating a third scale vector and a third shift vector based on the second batch-norm layer, and
      generating a second deconvolutional layer representing the corresponding group of the plurality of second groups based on the third scale vector, the third shift vector, and the first deconvolutional layer; and
   generating, by the neural network model generator, a second CNN model based on the second convolutional layer corresponding to each of the plurality of first groups and the deconvolutional layer corresponding to each of the plurality of second groups, wherein the second CNN model is utilized subsequently to classify an object perceived by an autonomous driving vehicle (ADV).

2. The computer-implemented method of claim 1, further comprising:
   for each group of the plurality of second groups,
      calculating a fourth scale vector and a fourth shift vector based on the second batch-norm layer and a second scaling layer of the corresponding group of the plurality of second groups; and
      generating the second deconvolutional layer based on the fourth scale vector, the fourth shift vector, and the first deconvolutional layer.

3. The computer-implemented method of claim 1, wherein the first scale vector and the first shift vector are calculated based on means and standard deviations of each dimension of the multi-dimensional input.

4. The computer-implemented method of claim 3, wherein the mean and the standard deviation are calculated for each dimension of the multi-dimensional input independently.

5. The method of claim 1, wherein the neural network model generator runs on a server that the ADV is communicatively coupled to.

6. A non-transitory machine-readable medium having instructions stored therein, which when executed by a processor, cause the processor to perform operations, the operations comprising:
receiving, at a neural network model generator, a first convolutional neural network (CNN) model as input to the neural network model generator, wherein the first CNN model is a fully trained CNN model;
extracting, by the neural network model generator, a plurality of first groups of layers and a plurality of second groups of layers from the first convolutional neural network (CNN) model, each group of the plurality of first groups having a first convolutional layer, a first batch-norm layer, and a first scaling layer that is separate from the first batch-norm layer, and each group of the plurality of second groups having a first deconvolutional layer and a second batch-norm layer;
for each group of the plurality of first groups,
calculating, by the neural network model generator, a first scale vector and a first shift vector based on the first batch-norm layer, wherein the first scale vector and the first shift vector are calculated scalarly for each dimension of a multi-dimensional input of the first convolutional layer,
calculating a second scale vector and a second shift vector based on the first scaling layer,
combining the first scale vector and the second scale vector into a combined scale vector, and the first shift vector and the second shift vector into a combined shift vector, wherein each of the first scale vector and the first shift vector is calculated from the first batch-norm layer, and wherein each of the second scale vector and the second shift vector is calculated from the first scaling layer, and
generating, by the neural network model generator, a second convolutional layer representing the corresponding group of the plurality of first groups based on the first convolutional layer, the combined scale vector, and the combined shift vector;
for each group of the plurality of second groups,
calculating a third scale vector and a third shift vector based on the second batch-norm layer, and
generating a second deconvolutional layer representing the corresponding group of the plurality of second groups based on the third scale vector, the third shift vector, and the first deconvolutional layer; and
generating, by the neural network model generator, a second CNN model based on the second convolutional layer corresponding to each of the plurality of first groups and the deconvolutional layer corresponding to each of the plurality of second groups, wherein the second CNN model is utilized subsequently to classify an object perceived by an autonomous driving vehicle (ADV).

7. The non-transitory machine-readable medium of claim 6, further comprising:
for each group of the plurality of second groups,
calculating a fourth scale vector and a fourth shift vector based on a second scaling layer of the corresponding group of the plurality of second groups; and
generating the second deconvolutional layer based on the fourth scale vector, the fourth shift vector, and the first deconvolutional layer.

8. The non-transitory machine-readable medium of claim 6, the first scale vector and the first shift vector are calculated based on means and standard deviations of each dimension of the multi-dimensional input.

9. The non-transitory machine-readable medium of claim 8, wherein the mean and the standard deviation are calculated for each dimension of the multi-dimensional input independently.

10. The non-transitory machine-readable medium of claim 6, wherein the neural network model generator runs on a server that the ADV is communicatively coupled to.

11. A data processing system, comprising:
a processor; and
a memory coupled to the processor to store instructions, which when executed by the processor, cause the processor to perform operations, the operations including:
receiving, at a neural network model generator, a first convolutional neural network (CNN) model as input to the neural network model generator, wherein the first CNN model is a fully trained CNN model,
extracting a plurality of first groups of layers and a plurality of second groups of layers from the first convolutional neural network (CNN) model, each group of the plurality of first groups having a first convolutional layer, a first batch-norm layer, and a first scaling layer that is separate from the first batch-norm layer, and each group of the plurality of second groups having a first deconvolutional layer and a second batch-norm layer,
for each group of the plurality of first groups,
calculating a first scale vector and a first shift vector based on the first batch-norm layer, wherein the first scale vector and the first shift vector are calculated scalarly for each dimension of a multi-dimensional input of the first convolutional layer,
calculating a second scale vector and a second shift vector based on the first scaling layer,
combining the first scale vector and the second scale vector into a combined scale vector, and the first shift vector and the second shift vector into a combined shift vector, wherein each of the first scale vector and the first shift vector is calculated from the first batch-norm layer, and wherein each of the second scale vector and the second shift vector is calculated from the first scaling layer, and
generating a second convolutional layer representing the corresponding group of the plurality of first groups based on the first convolutional layer, the combined scale vector, and the combined shift vector,
for each group of the plurality of second groups,
calculating a third scale vector and a third shift vector based on the second batch-norm layer, and
generating a second deconvolutional layer representing the corresponding group of the plurality of second groups based on the third scale vector, the third shift vector, and the first deconvolutional layer, generating a second CNN model based on the second convolutional layer corresponding to each of the plurality of first groups and the deconvolutional layer corresponding to each of the plurality of second groups, and classifying an object perceived by an autonomous driving vehicle (ADV) using the second CNN model.

12. The system of claim 11, further comprising:

for each group of the plurality of second groups, calculating a fourth scale vector and a fourth shift vector based on the second batch-norm layer and a second scaling layer of the corresponding group of the plurality of second groups; and generating the second deconvolutional layer based on the fourth scale vector, the fourth shift vector, and the first deconvolutional layer.

13. The system of claim 11, wherein the first scale vector and the first shift vector are calculated based on means and standard deviations of each dimension of the multi-dimensional input.

14. The system of claim 13, wherein the mean and standard deviation are calculated for each dimension of the multi-dimensional input independently.

15. The system of claim 11, wherein the neural network model generator runs on a server that the ADV is communicatively coupled to.

* * * * *